INVENTOR.
JOHN D. MORLEY
BY
Woodhams, Blanchard & Flynn
ATTORNEYS

April 7, 1970  J. D. MORLEY  3,505,496
SCARFING MEANS FOR ARC WELDER
Filed Dec. 12, 1966  4 Sheets-Sheet 2

INVENTOR.
JOHN D. MORLEY
BY Woodhams, Blanchard & Flynn
ATTORNEYS

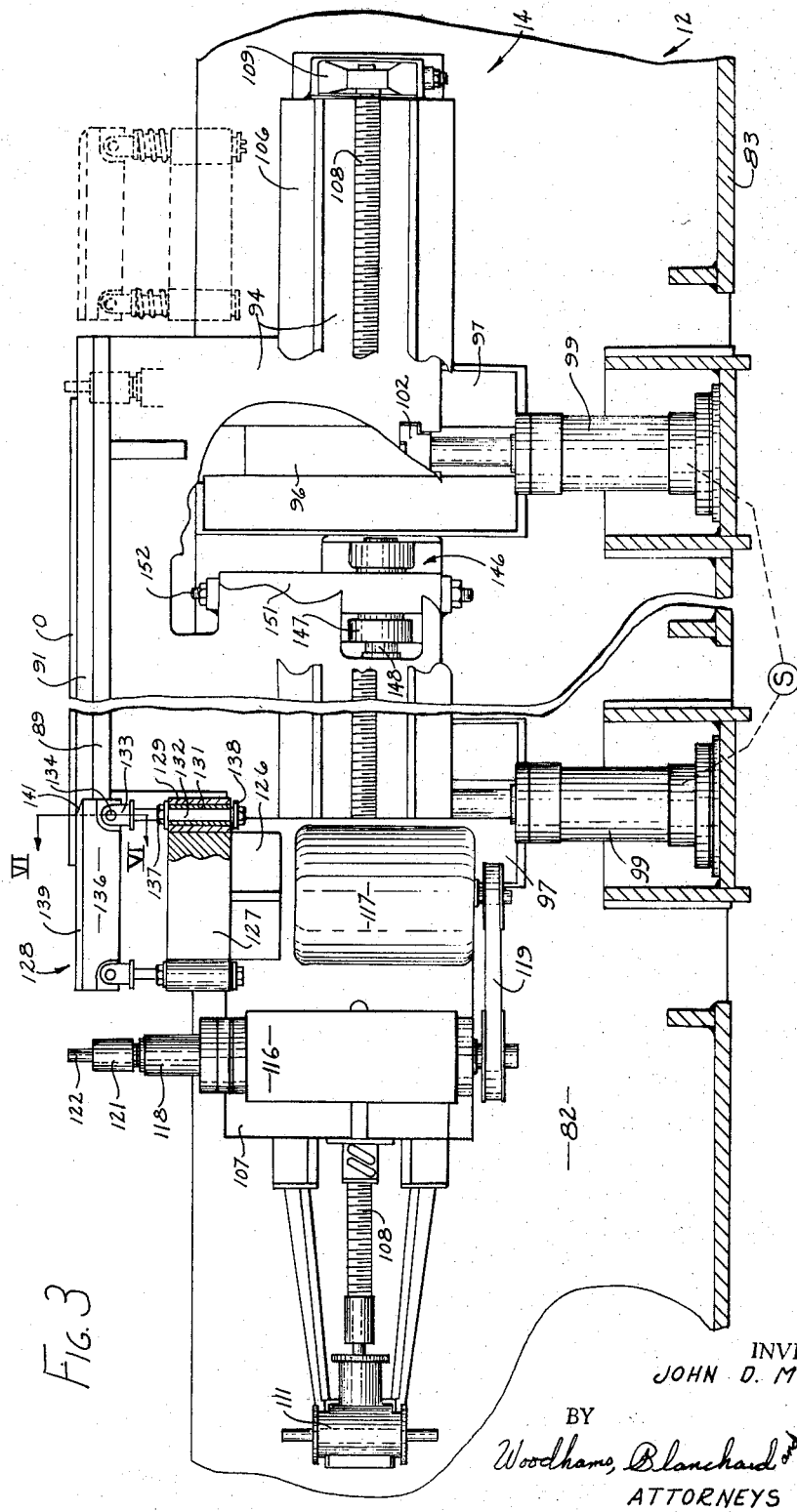

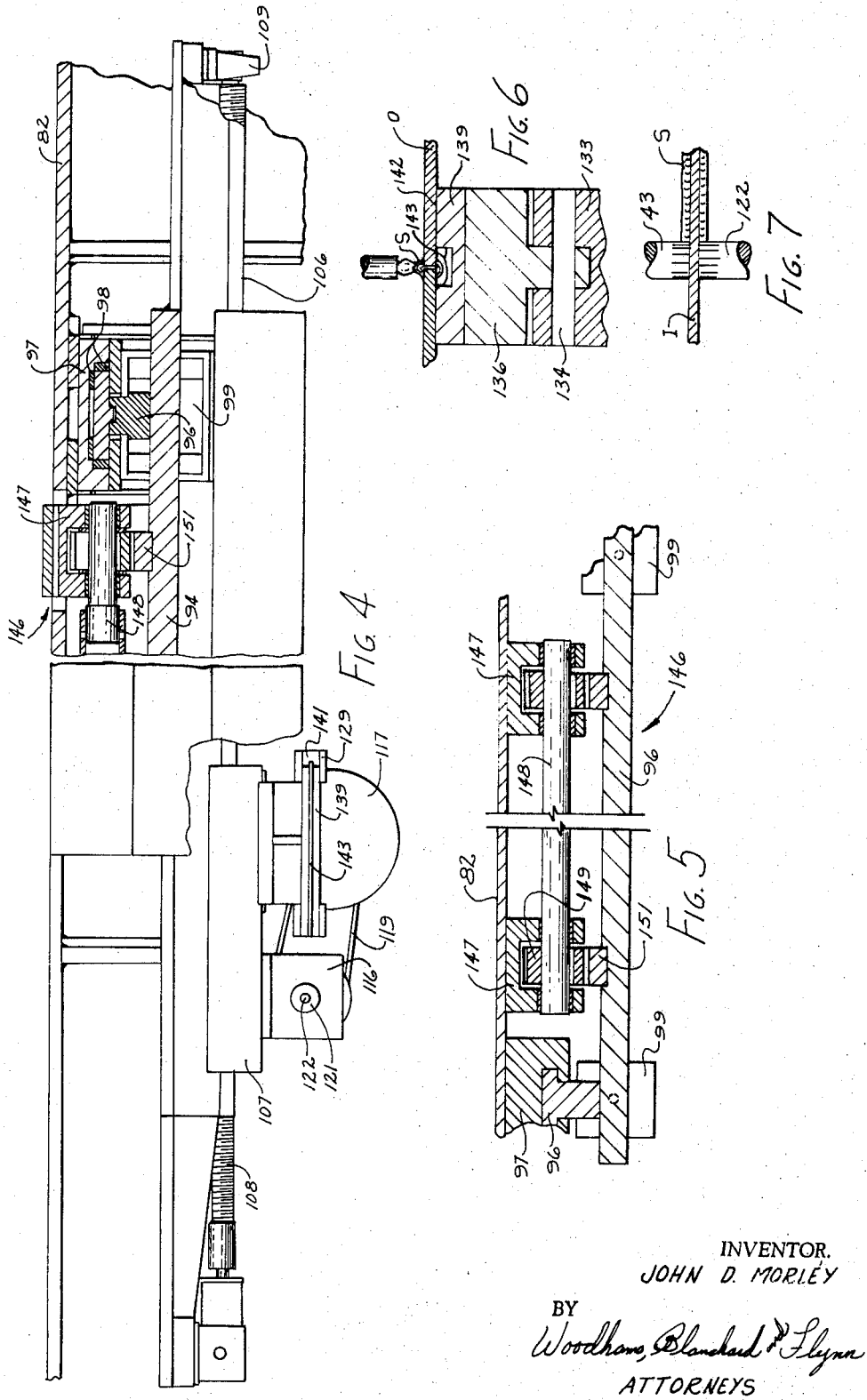

United States Patent Office 3,505,496
Patented Apr. 7, 1970

3,505,496
SCARFING MEANS FOR ARC WELDER
John D. Morley, Bay City, Mich., assignor, by mesne assignments, to Newcor Inc., Bay City, Mich., a corporation of Delaware
Filed Dec. 12, 1966, Ser. No. 600,993
Int. Cl. B23k 9/12
U.S. Cl. 219—125                              5 Claims

ABSTRACT OF THE DISCLOSURE

A welding machine having an intermediate body provided between a pair of supporting tables and in opposed relation to the welding torch for contacting the workpieces in the weld area sufficiently to form a heat sink. The intermediate body is mounted on a carriage movable in a direction parallel with the joint being welded. Metal removing means are mounted on the same carriage for traveling along the weld immediately behind the heat sink for removing excess weld metal from the weld seam to provide a planar surface across the seam.

---

This invention relates to a welding machine for welding together adjacent edges of sheet material and more particularly relates to a welding machine having means for removing excess weld metal from the welded joint so as to form a smooth surface across the weld zone coplanar with the corresponding faces of the joined sheets.

It is often desired that the weld seam joining two adjacent sheet edges be arranged to form an entirely smooth continuation of the surfaces of the adjacent sheet material. An example of such is welding of opposite edges of a single curved sheet of metal to form a tube where both the outside and inside of the tube must be smooth. A further example is the edge to edge welding of successive sheets to form a uniform continuous strip preparatory to passing same through processing means such as a pickling bath, an annealing furnace or pattern-applying rolls.

In edge to edge welding together of metal, as aforesaid, it has been long known to obtain a smooth weld by the technique of mash-seam welding utilizing resistance welding rolls, as shown in Bach Patent No. 3,119,289. The usefulness of the afore-mentioned patent is, however, limited to sheets of metal of approximately one-eighth inch thickness or less. Where thicker sheets of metal are to be united it is preferable for reasons well known in the industry to use one of the many arc welding techniques. Arc welding, however, builds up weld metal along the seam both above and below the surfaces of the metal sheets being welded which, when perfectly smooth results are required, has required the removal of such excess metal after the weld otherwise is completed.

Removal of excess weld metal has not been particularly difficult on the side of the sheet on which the welding head or torch travels and various devices, such as grinding wheels, have in the past been mounted on the same carriage upon which the welding torch is mounted so as to operate on the excess weld metal at a point immediately behind the welding torch. However, the opposite side of the weld cannot be handled in this way inasmuch as the welding zone of the sheets is normally in contact with a suitable table or pair of blocks, same being required both to support the sheets being welded and to provide a heat sink for the rapid withdrawal of welding heat from the metal being welded. The necessity for such a combined support and heat sink has heretofore made it impossible to provide anything corresponding to the above-mentioned travelling cutter or grinder on said opposite or heat sink side of the welded sheets.

Accordingly, the objects of the invention include:

(1) To provide an arc welding machine for effecting the welding together of adjacent edges of metal sheets wherein the weld material will not protrude beyond the plane defined by either the upper or lower surfaces of the sheets to be welded.

(2) To provide an arc welding machine, as aforesaid, arranged to remove excess weld metal protruding from that side of the weld opposite the welding torch at the completion of the welding operation.

(3) To provide an arc welding machine, as aforesaid, which will remove excess weld metal continuously and substantially simultaneously with the welding operation.

(4) To provide an arc welding machine, as aforesaid, which will perform its functions without materially, if at all, affecting the functioning of the usual heat sink.

(5) To provide an arc welding machine, as aforesaid, whose principles of operation are applicable to welding machines of various types, particularly machines for welding opposite edges of a sheet to form a tube and machines for welding adjacent ends of successive strips.

Other objects and purposes of the invention will be apparent to persons acquainted with apparatus of this general type upon reading the following specification and inspection of the accompanying drawings.

In the drawings:

FIGURE 3 is an enlarged, partially broken fragment of FIGURE 1.

FIGURE 4 is a fragmentary top view of the lower portion of the machine substantially taken along the line IV—IV of FIGURE 2 and being partially broken to show details of the torsion bar and pressure fluid cylinder mounting.

FIGURE 5 is a diagrammatic top view of the torsion bar disclosing the connection thereof to one of the table supports of the lower unit of the machine.

FIGURE 6 is an enlarged fragment of FIGURE 2.

FIGURE 7 is an enlarged fragment of FIGURE 1 with the cutting heads in a different position of use.

Figure 2:
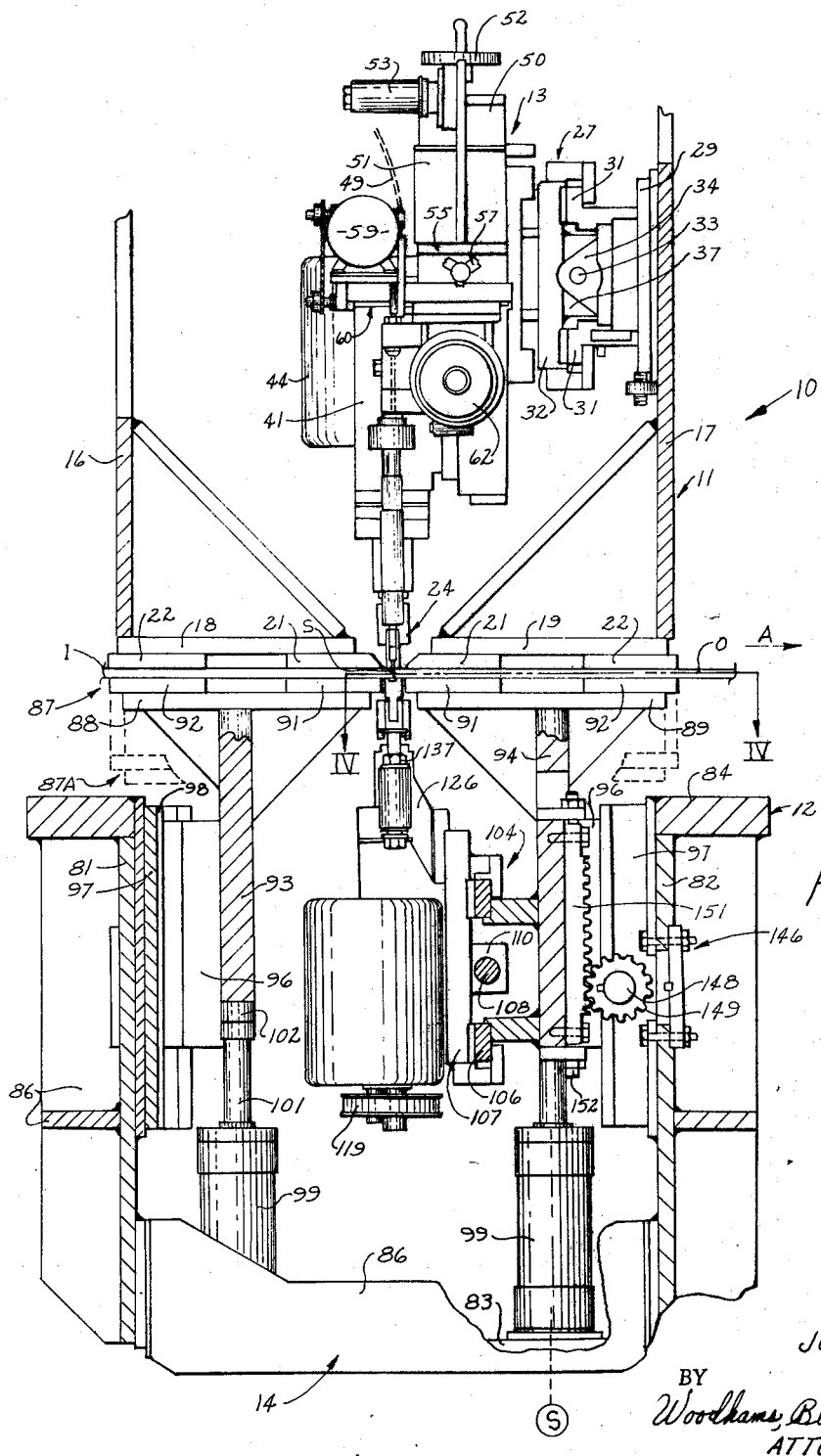
FIGURE 2 is an enlarged sectional view essentially as taken on the line II—II of FIGURE 1 and partially broken to show the connection of one of the elevating pressure fluid cylinders and lower table supports to the machine frame.

Certain terminology will be used in the following description for convenience in reference only and will not be limiting. The words "upwardly," "downwardly," "rightwardly" and "leftwardly" will designate directions in the drawings for which reference is made. The words "forwardly" and "rearwardly" will refer to the direction of sheet flow through the machine, forwardly being the normal flow direction and from left to right as seen in FIGURE 2. The words "inwardly" and "outwardly" will refer to directions toward and away from, respectively, the geometric center of the machine and designated parts thereof. Further, the terms "tail end" or just "tail" will refer to the end of the outgoing strip, that is, the strip on the exit side of the machine. The term "head end" or simply "head" will refer to the approaching end of the incoming strip, that is, the strip on the entry side of the machine. The terms "entry" and "exit" will be applied to portions of the machine which a forwardly travelling strip will meet first and last, respectively.

GENERAL DESCRIPTION

In general, the invention consists of providing a welding machine in which the conventional fixed supporting tables carrying the sheets to be welded are spaced apart a short distance from each other. An intermediate body of metal is provided between the tables and in opposed relation to the welding torch for contacting the workpieces in the weld area sufficiently to form a heat sink. The intermediate body is mounted on a carriage movable in a direction parallel with the joint being welded. Metal removal means, such as a fixed knife, a rotatable milling cutter or a grinding wheel, is mounted on the same carriage for travelling along the weld immediately behind the heat sink for removing excess weld metal from the weld seam to provide a planar surface across the seam.

DETAILED DESCRIPTION

Figure 1:
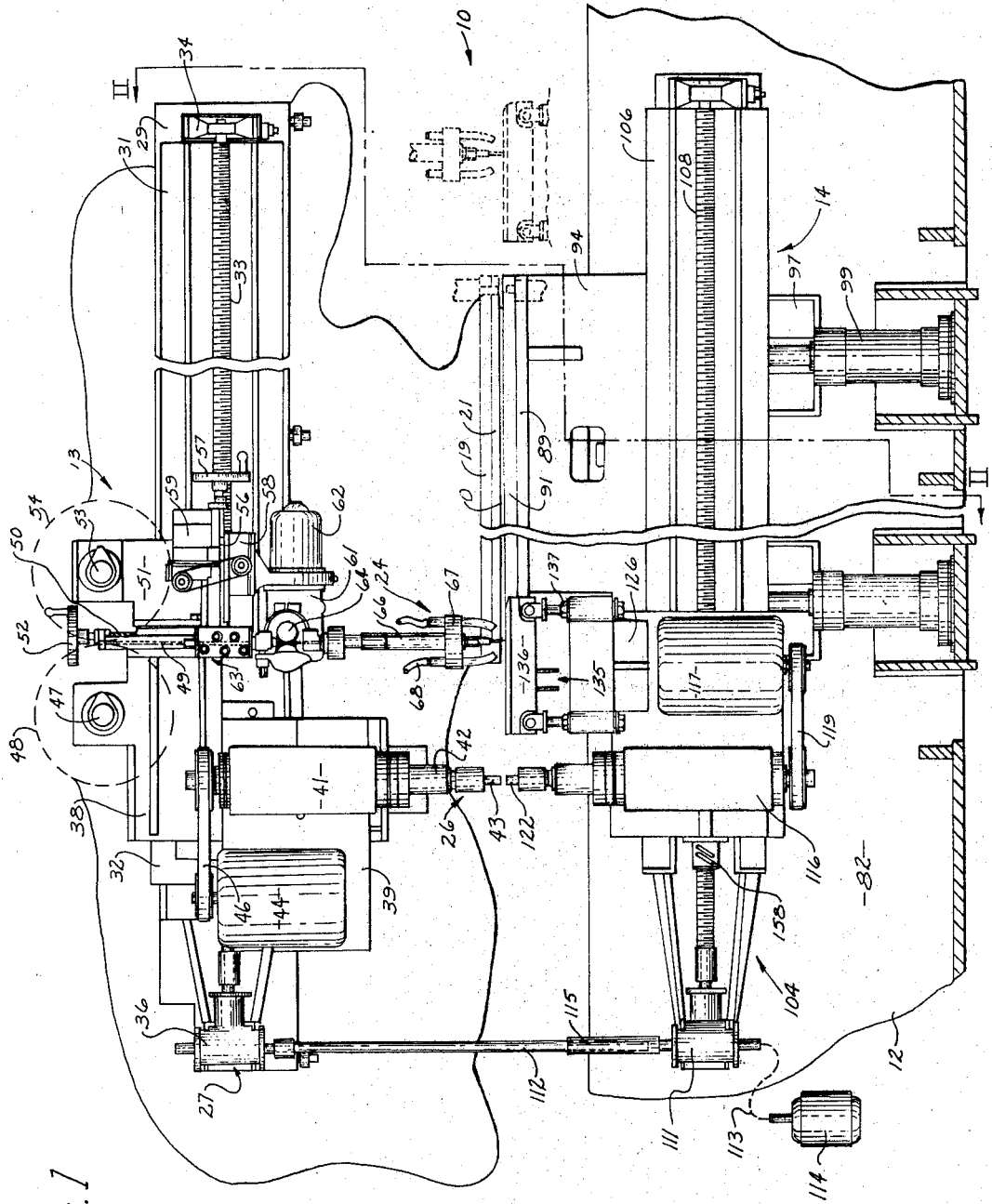
FIGURE 1 is a side elevational view of a welding machine embodying the invention.

Turning now to FIGURES 1 and 2, the welding machine 10 embodying the invention includes vertically spaced, relatively fixed upper and lower frame portions 11 and 12, respectively, which carry upper and lower welding and scarfing units 13 and 14, respectively.

The upper frame portion 11 may be of any convenient construction and in the particular embodiment includes a spaced pair of upstanding side walls 16 and 17 (FIGURE 2) having opposed, closely spaced horizontal shelves 18 and 19 fixed to the bottom edges thereof and extending therealong and brace with respect thereto. Each of the shelves 18 and 19 is equipped on its lower face with an inner pad 21 at the inner edge thereof and an outer pad 22 at the outer edge thereof. Pads 21 and 22 extend along the shelves 18 and 19, the opposed edges of the inner pads 21 being spaced from each other and preferably beveled along the upper edges. The lower faces of the pads 21 and 22 define a common plane beneath which transversely pass horizontal strips to be joined by welding, the movement of the strips here being in the direction of the arrow A in FIGURE 2. As described hereinafter, the adjacent ends of an outgoing strip O and incoming strip I are joined in a seam S between the inner pads 21 by the welding machine 10.

The upper unit 13 may be of any convenient type having a welding head or torch 24 for welding the adjacent ends of the incoming and outgoing strips together along the seam S. The welding head may be a gas welding head if desired but in the present embodiment is an arc welding head. The upper unit 13 further includes a scarfing device 26 disposed behind the torch 24 for removing excess weld material from the upper face of the seam S so as to provide a continuous flat surface across the upper faces of the strips O and I at the seam S. Suitable traversing means indicated generally at 27 (FIGURES 1 and 2) are provided for causing the welding head 24 and scarfing device 26 to move along the seam S.

In the particular embodiment shown, the traversing means 27 includes a pair of ways 31 (FIGURE 2) which are vertically spaced and extend horizontally above, across and beyond the outgoing strip O. The ways 31 are carried by a mounting plate 29 affixed to the side wall 17 on the inner surface thereof. A carriage 32 is supported for sliding movement along the ways 31. A screw 33 is rotatably supported between the ways 31 at the rightward end thereof by a bearing 34 (FIGURE 1) and at the leftward end thereof by a right angle drive 36. The screw 33 extends close to the rightward (FIGURE 2) face of the carriage 32 and threadedly engages a drive block 37 fixed to the carriage whereby rotation of the screw causes the carriage to slide along the ways 31 transversely of the strips I and O.

The carriage 32 supports a vertically oriented mounting platform 38 having a portion 39 upon which is mounted a bearing structure 41 for the scarfing device 26. More particularly, the bearing structure 41 rotatably supports a spindle 42 at the lower end of which suitable scarfing means, here a milling cutter 43, is chucked for scarfing the upper bead along the weld seam S. A drive motor 44 is mounted on the portion 39 and drives the spindle 42 through a belt 46 or the like.

The mounting platform 38 also carries, adjacent its upper edge, a rotatable stub shaft 47 upon which may be supported a welding rod reel 48 for supplying welding rod to the welding head 24, such welding rod being indicated in broken lines at 49. A bracket 51 is mounted for vertical adjustment on the rightward (FIGURE 1) edge of the platform 38 by a conventional screw actuated slide assembly generally indicated at 50 having a manually actuable hand crank 52. The vertically adjustable bracket 51 carries a further stub shaft 53 parallel to and horizontally aligned with the stub shaft 47 for supporting a second reel indicated in broken lines at 54 for welding rod. The bracket 51 pendently supports a further bracket 56 for horizontal adjustment with respect thereto transversely of the strips I and O by means of a further conventional screw type adjusting mechanism 55 having a hand crank 57. A third bracket 58 is pendently supported from the bracket 56 for horizontal sliding adjustment with respect thereto in the direction of strip movement by a still further conventional screw type adjustor 60 here driven by a motor 59. The third or lower bracket 58 supports a welding rod feeding mechanism 61 incorporating a motor 62 for rotating a pair of weld rod feeding rolls 64. A wire straightening device 63, comprising a plurality of rollers alternately spaced along the path of the welding rod on opposite sides thereof, is supported by the feed device 61 above the rod feeding rolls 64 thereof. The weld head 24 depends from the feed device 61 and is fixed thereto by a vertically elongated conduit 66. Where the welding head 24 is an arc welding head, weld current may be supplied to the work by any convenient and conventional means not shown. A mounting 67 may be provided on the lower end of the conduit 66 for supporting suitable tubes 68 capable of providing a nonair atmosphere in the welding zone in a conventional manner.

The lower frame portion 12 (FIGURES 2 and 3) is of generally U-shaped, upwardly opening cross section as seen in FIGURE 2 and includes side walls 81 and 82 and a horizontal bottom wall 83. In the embodiment shown, outwardly extending flanges 84 are provided at the top of the side walls 81 and 82 and suitable transverse ribs 86 are provided to rigidify the walls and bottom frame portion 12.

The lower frame 12 includes a table generally indicated at 87 which is split beneath and along the seam S and, hence, below the line of travel of the weld head 24 to form two spaced portions 88 and 89. The table portions 88 and 89 underlie the shelves 18 or 19, respectively, of the upper frame portion 11. The upper surfaces of the table portions 88 and 89, are provided with pads 91 and 92 along the inner and outer edges, respectively, thereof. The pads 91 and 92 underlie the pads 21 and 22, respectively, and with the table portions 88 and 89 in their uppermost position shown, bear upon the underside of the strips I and O to urge same firmly against the pads 21 and 22 thereabove to hold the strips fixedly in place during welding.

The table portions 88 and 89 are supported on preferably identical, upstanding plates 93 and 94, respectively. The plates 93 and 94 have generally T-cross-sectional (FIGURE 4) and vertically aligned slide members 96 adjacent the ends thereof. The slide members 96 are vertically slideably disposed in vertically aligned slideways 97 of corresponding cross section fixed to the interior of the walls 81 and 82. The slideways 97 are here provided with low friction liner pieces 98 on which the slide members 96 bear.

The upstanding plates 93 and 94 are each disposed directly above a pair of pressure fluid cylinders 99 fixed upon the bottom wall 83 opposite corresponding slideways 97. The piston rods 101 of the cylinders 99 extend upwardly therefrom in the plane of the corresponding plates 93 and 94 and fixedly carry generally T-shaped keys 102 at their upper ends. The keys 102 are disposed in correspondingly shaped notches 103 in the lower edges of the plates 93 and 94 to secure the piston rods 101 to the plates. Thus, each of the table portions 88 and 89 is guided for vertical sliding motion by the slide members 96 and slideways 97 and vertically moved by extension and retraction of the piston rods 101 in response to energization of the pressure fluid cylinders 99. The slide members 96 and slideways 97 are relatively long to prevent the plates 93 and 94 from cocking in response to the weight of the table portions and strips carried thereby. Thus, the table portions 88 and 89 are maintained horizontal as they rise and fall. The slideways 97 and slide members 96 also prevent horizontal movement of the plates 93 and 94 and table portions 88 and 89.

The plate 94 differs from the plate 93 in that it mounts on its inner surface lower traversing means 104 including a set of ways 106 which are preferably identical and parallel to the ways 31 described hereinabove with respect to the upper traversing means 27. The lower traversing means 104 further includes a carriage 107 mounted for horizontal sliding movement along the ways 106 and hence in parallel with the seam S. A screw 108, preferably of the same pitch as the screw 33, extends along and between the ways 106. The screw 108 is supported at its rightward end by a bearing 109 and is supported and rotatably driven at its leftward end (FIGURE 3) by a right angle drive unit 111. The screw 108 threadedly engages a drive block 110 (FIGURE 2) rigidly fixed to the carriage 107 whereby rotation of the screw 108 causes the carriage 107 to move along the ways 106. The right angle drive unit 111 and the corresponding drive unit 36 of the upper unit 13 are positively connected by a drive shaft 112 (FIGURE 1). The drive shaft 112 includes an axially telescoping portion 115 positively circumferentially connected as through splines, keys or the like, not shown, to the remainder thereof to provide a positive rotative driving connection between the two drive units 36 and 111 while allowing the lower drive unit 111 to freely rise and fall with the plates 94. One, here, the lower, right angle drive 111 is in turn energized through any convenient direct mechanical linkage indicated by the broken line 113 from a suitable drive motor 114. Thus, the carriages 107 and 32, which are initially opposed to each other, will remain in such opposed relationship as they reciprocate along their respective ways in response to energization of the motor 114.

The carriage 107 (FIGURES 2 and 3) carries a bearing structure 116 and a motor 117 in side-by-side vertically aligned relationship. A spindle 118 extends rotatably through the bearing structure 116. The lower end of the spindle 118 is driven from the depending output shaft of the motor 117 through the belt 119 or other suitable drive. The upper end of the spindle 118 supports, in a suitable chuck 121 or the like, a milling cutter 122 in coaxially aligned spaced relation to the milling cutter 43 of the upper welding and scarfing unit 13 above described. The milling cutters 122 and 43 are spaced by the thickness of the sheets O and I and by adjustment of the height of the upper cutter 43, the top of the lower cutter being level with the pads 91. The bearing 116, motor 117, spindle 118 and milling cutter 122 are preferably identical to the corresponding parts of the upper welding and scarfing unit 13 and preferably similarly arranged except for being rotated to 180° as a whole therefrom in the plane of the ways 106. The milling cutter 122 and chuck 121 are aligned with the space between the pads 91 and table portions 88 and 89 for clear passage therethrough.

A bracket 126 is fixed to the leftward (FIGURE 2) face of the carriage 107 adjacent the top edge thereof and extends upwardly and away therefrom. The bracket 126 fixedly supports a heat sink assembly 128 including a mounting member 127 (FIGURES 2 and 3). The mounting member 127 extends along the screw 108. The mounting member 127 is provided with upstanding guides 129 fixed at the ends thereof and disposed beneath the space between the table portions 88 and 89 and thus below the seam S. The guides 129 are preferably internally bushed as indicated at 131 for receiving vertically reciprocable posts 132 therethrough. Yokes 133 secured to the upper ends of the posts 132 are fixed by pins 134 to the ends of a generally rectangular heat sink body or shoe 136 supportedly extended therebetween. The shoe 136 is thus disposed between the pads 91 in close spaced relation thereto and is arranged with the torch 24 thereabove and somewhat to the right (FIGURE 1) of the center thereof.

In the particular embodiment shown, the end portions of the heat sink body 136 are relieved for receiving the yokes 133 thereabout. Coil springs 137 are coaxially arranged on the posts 132 between the yokes 133 and the upper face of the mounting member 127 for urging said posts upwardly. Radially extending stops 138 fixed to the lower end of each of said posts prevent the posts from being drawn upwardly out of the mounting member 127 by opposition to the lower wall thereof.

The heat sink body or shoe 136 is preferably provided with a wear plate 139 rigidly held to the upper surface thereof by any convenient means such as screws, not shown. The leading (rightward as seen in FIGURE 3) edge of the wear plate 139 is preferably tapered as indicated at 141 to avoid snagging of the strips to be welded. The upper surface 142 bears snugly against the lower surfaces of the strips I and O to be welded (as indicated in FIGURE 6), the shoe 136 being centered beneath the seam S. The wear plate 139 is provided with a central groove 143 in the upper surface 142 thereof which is aligned with and disposed beneath the seam S and is of sufficient width and depth as to clear the excess welding material extending beyond the lower surface of the strips I and O at the seam S. The groove 143 extends the length of the wear plate 139. Nuts 137 are provided above and below the guides 129 for cooperation with the posts 132 whereby the vertical position of the heat-sink 136 can be adjusted as desired. The heat sink is preferably water cooled in any conventional manner, such as to inlet and outlet conduits schematically indicated at 135 (FIGURE 1).

An equalizing device generally indicated at 146 (FIGURES 2, 4, and 5) connects between the plate 94 and the side wall 82 to prevent the plate 94 from cocking in its own plane as a result of uneven loading thereof and hence of the pressure fluid cylinders supporting same. Such uneven loading results when the carriage 107 is at either extreme of its travel due to the weight of the carriage. More particularly, the equalizing device 146 comprises a horizontally spaced pair of coaxial bearings 147 fixed to the inner surface of the wall 82 opposite the plate 94. The bearings 147 are spaced between the slideways 97. A torsion bar 148 is rotatably supported in the bearings. Pinion gears 149 are fixed to the torsion bar for rotation therewith adjacent the ends thereof. Vertically extended racks 151 are fixed to the outer face of the plate 94 in opposed relation to the pinion gears 149 and are arranged for toothed engagement therewith. Vertical adjustment screws 152 (FIGURES 2 and 3), threadedly mounted with respect to the plate 94, are preferably provided at the ends of the racks 151 for precisely adjusting the vertical position of the racks 151 prior to securing same to the plate 94 to minimize backlash. The torsion bar 148 is preferably very stiff torsionally so that the table portion 89 will be constrained thereby to remain level while at rest or in motion at any point in its travel. Morevoer, the table portion 89 will be uniformly pressed upwardly against the outgoing strip O when in its raised position regardless of the position of the carriage 107 along its path of travel.

OPERATION

In its rest position, the machine 10 is arranged with the carriages 39 and 107 at the leftward (FIGURE 1) ends of their travel and with the table 87 in its lowered position indicated in broken lines in FIGURE 2 at 87A. The strips O and I to be welded are placed in the machine 10 essentially in their positions of FIGURE 2 and between the upper frame portion 11 and table 87, the ends of the strips having been previously trimmed and spaced as desired from each other by any convenient means, not shown. If desired, for example, the strips O and I may be led after trimming into their positions shown sequentially preferably in the direction of the arrow A or, alternatively, from opposite sides of the machine. On the other hand, the welding machine 10 is particularly adapted for use with a trimming apparatus as disclosed in copending application Ser. No. 576,410 assigned to the assignee of the present invention wherein the incoming and outgoing strips are trimmed in fixed aligned position and a frame corresponding to the frame portions 11 and 12 of FIGURE 2 is moved rightwardly across the strips to place the welding units 13 and 14 in their positions of FIGURE 1 on opposite side of the strips.

Once the incoming and outgoing strips are positioned as in FIGURES 1 and 2 for welding the pressure fluid cylinders 99 are energized from a suitable source S of pressure fluid to extend the piston rods 101 thereof and thus raise the plates 93 and 94. The rising plates 93 and 94 are vertically guided by the slideways 97 on the frame walls 81 and 82. The plate 93 and table portion 88 supported thereon are relatively light and preferably weigh equally on the cylinders 99 supporting same so that there is little or no tendency for the plate 93 to cock in its own plane and any such tendency is adequately overcome by the sliding connection of the slide members 96 and the slideways 97 associated therewith. Thus, the table portion 88 rises uniformly, being maintained in horizontal condition as it rises, and urges the incoming strip I firmly against the pads 21 and 22 of the upper frame portion 11 to hold the incoming strip in position for welding.

The pressure fluid cylinders 99 carrying the plate 94 and table portion 89 are, at the beginning and end of the welding operation, unevenly loaded, due to the uncentered position at such times of the carriage 107 and the relatively heavy spindle 118, bearing 116, motor 117 and heat sink shoe 136 carried thereby and, after the table portion 89 is raised, to the upward thrust of the heat sink shoe against the strips O and I. However, any tendency for the more heavily loaded one of the cylinders 99 supporting the plate 94 to lag behind the other in raising the table portion 89 is eliminated by the equalizing device 146. More particularly, engagement of the racks 151 adjacent the ends of the plate 94 through the positively connected pinion gears 149 and torsion bar 147 positively maintains the plate 94 level regardless of the longitudinal distribution of weight therealong. Thus, the equalizing device 146 equalizes the loading and hence the advance of the pressure fluid cylinders 99 supporting the plate 94 and causes the table 89 to rise to maintain its horizontal position as it rises.

When the rising table portion 89 reaches its upward limiting position, the pads 91 and 92 thereon firmly press the outgoing strip O against the pads 21 and 22 on the upper frame portion 11. The mill spindle 122 and heat sink shoe 136 move into their upper positions shown with the table portion 89 whereat their upper faces are level with the lower faces of the strips.

With the carriage 107 in its leftwardmost position shown in FIGURE 1, the lower mill spindle 122 and the upper mill spindle 43 opposed thereto, are spaced leftwardly from the strips. The heat sink 136 partially underlies such strips. The torch or welding head 24 is disposed above the heat sink 136 intermediate the ends thereof and near the strips O and I. The milling cutters, torch and heat sink unit remain fixed with respect to each other during the course of operation of the machine due to the solid driving connection 112 therebetween. The leftward limiting position of carriages 107 and 32 may be determined either by stopping of the motor 114 or by provision of a suitable positive limiting device adjustable longitudinally of the ways 106, here for example, an adjustable nut 158 (FIGURE 1) on the screw 108 adjacent the leftward end thereof.

The nuts 137 hold the shoe firmly against the underside of the strips O and I. The torch or welding head 24 here illustrated is an arc welding of any conventional type or, if desired, may be a conventional gas welding torch. The welding rod 49 in either case is fed downwardly by the drive motor 62 and the torch 24 is arranged to apply heat and welding rod to the opposed edges of the strips to form a weld seam above the heat sink 136. The motor 114 then energizes the screws 108 and 33 to move the lower carriage 107 and upper carriage 32 rightwardly along their respective ways. As a result, the torch 66 and heat sink 136 move rightwardly along the seam, the torch 24 forming a weld as it goes and the heat sink 136 removing heat from the welded seam at and behind the torch 24. As a result, a portion of the seam spaced behind the torch 24 by the trailing extent of the heat sink 136 is cooled to be scarfed, the scarfing means here being the mill cutters 43 and 122 driven by motors 44 and 117, respectively, which, as seen in FIGURE 7, move along the seam and remove excess welding material therefrom so that the sheets O and I are joined by a flush seam.

Welding continues as the heat sink 136 moves rightwardly along and between the pads 91 of the table portions 88 and 89. The groove 143 in the upper face of the heat sink loosely receives the excess weld metal protruding from the bottom side of the seam and thus allows the side portions of the upper face 142 of the heat sink 136 to remain in good thermal contact with the undersides of the sheets I and O. When the torch 24 moves past the rightward edge of the strips, heat supply thereto is extinguished by any convenient means. Thereafter, the trailing edge of the heat sink 136 and the scarfing means comprising milling cutters 43 and 122 also complete their work and move off the welded and scarfed strips to limiting positions indicated in broken lines in FIGURE 1.

The pressure fluid cylinders 99 are then energized to retract and the table portions 88 and 89 together with the ways 106 and carriage 107 are lowered from their uppermost position shown and the drive 113 is reversed to return the carriages 32 and 107 to their leftward limiting positions shown. This completes a full cycle of operation. The welded strip comprising portions O and I and seam S may be removed from the apparatus as desired.

While the foregoing description has assumed that welding and milling will take place substantially simultaneously, it will be also within the scope of the present invention for operations to be carried out successively. For example, on the 400 series stainless steel it is necessary for metallurgical reasons to weld at a higher speed than the rate in which the milling can be carried out. In such case, the mills are retracted during the welding operation and the milling is done on the return stroke of the milling-welding carriage.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an arc welding machine for joining together the adjacent edges of sheet material, the combination comprising:
   a pair of spaced tables for supporting said sheet material in at least substantially abutting relationship;
   a heat sink mounted between said tables for movement in a direction parallel with said edges of sheet material and having at least a substantial portion of its upper surface coplanar with the surface of said tables;
   propulsion means for affecting movement of said heat sink between said tables in a direction parallel to said edges;
   first metal removal means mounted for movement in trailing relationship to said heat sink during a welding operation and arranged for removing welding metal projecting beyond the surface of said sheet metal contacted by said heat sink, said heat sink and said first metal removing means being supported on one of said spaced tables for reciprocation by said propulsion means along the length of the seam;

a weld torch opposed to said heat sink and arranged for supplying welding metal to said seam at said heat sink, said torch being arranged for movement simultaneously with the heat sink along said seam;

second metal removing means mounted for movement along said seam simultaneously with and behind said welding torch for removing excess welding material from the surface of said sheet material opposed to said torch;

at least a pair of pressure fluid cylinders supporting each of said tables for raising said tables into contact with said sheet material and for lowering said tables away therefrom, the one of said tables supporting said first metal removing means and said heat sink being provided with equalizing means comprising a pair of vertically aligned racks disposed on said one of said tables closely adjacent the pressure fluid cylinders supporting same and a rigid shaft carrying pinion gears engaging said racks and supported for rotation by means fixed with respect to said pressure fluid cylinders whereby the resistance of said shaft to torsion maintains said pressure fluid cylinders similarly loaded and said one of said tables level.

2. The device defined in claim 1 including clamp means disposed above said tables for clamping the sheet material thereagainst, said torch and said further removable metal means being mounted for reciprocation with respect to said clamp means.

3. The device defined in claim 1 including a pair of ways disposed beneath and offset from the welding seam and a carriage reciprocable therealong said heat sink and said first-mentioned metal removal means being mounted on said carriage and aligned with said weld seam; and wherein said propulsion means comprising a screw threadably engaging said carriage means and extending along said ways, rotation of said screw causing said carriage to move said heat sink and said first-mentioned metal removal means along and beneath said seam.

4. The device defined in claim 3 including further ways, a further carriage and a further screw disposed above said strips, said further carriage supporting said torch and said further metal removing means for movement along the upper face of the seam, and including means providing a rigid driving connection between said first-mentioned and further screws whereby said first-mentioned and further carriages move together along their corresponding ways.

5. In an arc welding machine for joining together the adjacent edges of sheet material, the combination comprising:

a pair of spaced tables for supporting said sheet material in at least substantially abutting relationship;

a heat sink mounted between said tables for movement in a direction parallel with said edges of sheet material and having at least a substantial portion of its upper surface coplanar with the surface of said tables;

propulsion means for affecting movement of said heat sink between said tables in a direction parallel to said edges;

first metal removal means mounted for movement in trailing relationship to said heat sink during a welding operation and arranged for removing welding metal projecting beyond the surface of said sheet metal contacted by said heat sink, said heat sink and said first metal removing means being supported on one of said spaced tables for reciprocation by said propulsion means along the length of the seam;

a weld torch opposed to said heat sink and arranged for supplying welding metal to said seam at said heat sink, said torch being arranged for movement simultaneously with the heat sink along said seam;

second metal removing means mounted for movement along said seam simultaneously with and behind said welding torch for removing excess welding material from the surface of said sheet material opposed to said torch;

at least a pair of pressure fluid cylinders supporting each of said tables for raising said tables into contact with said sheet material and for lowering said tables away therefrom, the one of said tables supporting said first metal removing means and said heat sink being provided with equalizing means secured to the rods of a pair of said pressure cylinders supporting one of said tables for mechanically interconnecting said rods to assure a simultaneous and equal movement of said rods upon an energization of said cylinders to equalize the load on said pressure fluid cylinders.

References Cited

UNITED STATES PATENTS

| 1,653,376 | 12/1927 | Skelly | 219—125 |
| 2,371,823 | 3/1945 | Jackson | 228—50 |
| 2,866,077 | 12/1958 | Morton et al. | 219—125 |
| 3,197,604 | 7/1965 | Turbyville et al. | 219—160 X |

FOREIGN PATENTS 1,191,920  4/1965  Germany.

JOSEPH V. TRUHE, Primary Examiner

L. A. SCHUTZMAN, Assistant Examiner

U.S. Cl. X.R.

228—50